United States Patent Office 3,386,557
Patented June 4, 1968

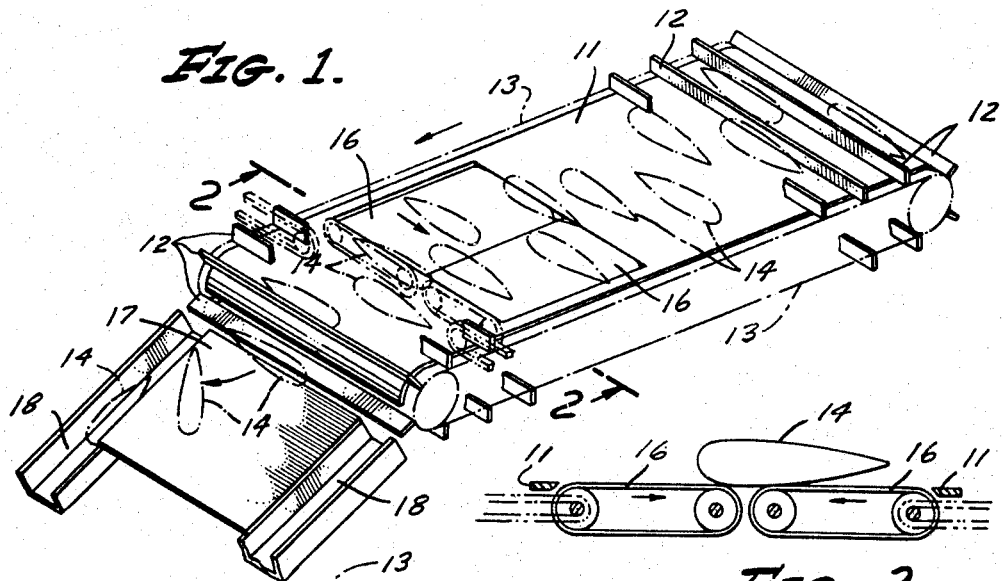
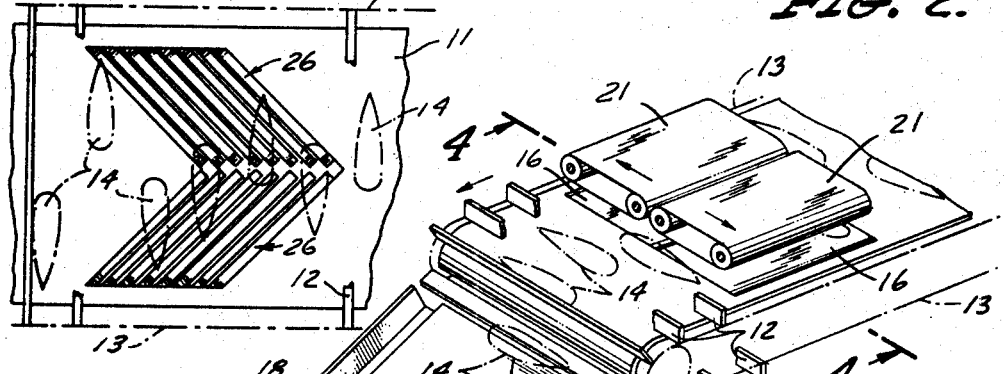
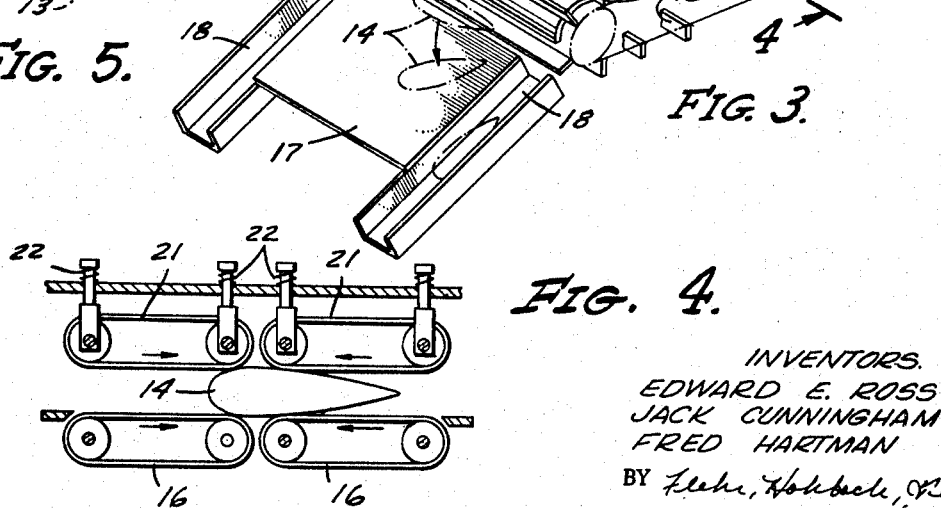

3,386,557
METHOD AND APPARATUS FOR ORIENTING ELONGATED TAPERED AGRICULTURAL PRODUCTS
Edward E. Ross, Lafayette, Calif., Jack Cunningham, Pittsburgh, Pa., and Fred Hartman, Toppenish, Wash., assignors to California Packing Corporation, San Francisco, Calif., a corporation of New York
Continuation-in-part of application Ser. No. 394,486, Sept. 4, 1964. This application Apr. 6, 1967, Ser. No. 628,971
6 Claims. (Cl. 198—30)

ABSTRACT OF THE DISCLOSURE

A method and apparatus for orienting elongated tapered agricultural products (e.g., corn). The products are conveyed over a table and then deposited upon the upper end of an inclined roll surface. While being conveyed along the table surface the products are arranged to control the areas of the roll surface upon which the products are deposited. The products roll down the roll surface in an arcuate manner and are received in means located along the side edges of the roll surface, with their largest ends pointing downwardly.

---

This invention is related to the processing of agricultural products, and more particularly to a method and apparatus for orienting elongated tapered agricultural products such as corn, carrots, turnips, parsnips and the like. The present application is a continuation of part of our copending application S.N. 394,486, filed Sept. 4, 1964, and entitled, "Method and Apparatus for Orienting Tapered Agricultural Products."

In Patent No. 3,268,057 we have disclosed and claimed an apparatus for the orientation of elongated tapered agricultural products which involves the use of a sloped roll surface upon which the products are deposited. Each product so deposited rolls down in an arcuate manner whereby it is received in means located at the side edges of the surface, with its largest end pointed downwardly. For best results it is desirable to control the areas of the roll surface upon which the products are deposited. Particularly it is desirable for each product to be deposited in an optimum position relative to the side edges of the roll surface, and in such a manner that the products will not interfere with each other during their rolling motion.

In general, it is an object of the present invention to provide an apparatus and method which utilizes the principles disclosed in the aforesaid Patent 3,268,057, but which deposits the products upon the upper end of the roll surface in a predetermined optimum manner.

Another object of the invention is to provide an apparatus and method of the above character which employs a pre-arranging of the products immediately before they are delivered to the upper end of a roll surface.

Additional objects and features of the invention will appear from the following description in which the preferred embodiment has been set forth in detail in conjunction with the accompanying drawing.

In general, the invention consists of a table forming an upwardly faced working surface. Means is provided for conveying the elongated tapered agricultural products over the table surface with the axes of the products disposed laterally of the direction of conveying movement. At the discharge end of the table means is provided which forms a sloped or inclined roll surface. This surface has its upper end located to receive products derived from the table, and such products are caused to roll down this surface in an arcuate manner. Means is provided in conjunction with the table surface for acting upon the products whereby they are arranged in a predetermined manner before being discharged upon the roll surface. At the side edges of the roll surface means are provided for receiving the products with their largest diameter ends pointed downwardly.

Referring to the drawing:

FIGURE 1 is a perspective view schematically illustrating one embodiment of our invention;

FIGURE 2 is a detail in section, taken along the line 2—2 of FIGURE 1 showing the means which acts upon the products to arrange them as they are being moved toward the roll surface;

FIGURE 3 is a view like FIGURE 1 but showing a modification; and

FIGURE 4 is a cross-sectional detail taken along the line 4—4 of FIGURE 3;

FIGURE 5 is a fragmentary plan view showing another embodiment.

The apparatus shown in FIGURE 1 consists of a feed table 11, the upper working surface of which may be horizontal. The means employed for moving ears of corn or other elongated tapered agricultural products over the table surface consists in this instance of the parallel spaced flights 12 which are indicated as being attached at their ends to the endless conveyer chains 13. It is assumed that ears of corn 14 are deposited between the flights 12 either manually or by suitable mechanical means. As conveyed across the table surface by the flights 12, the axes of all of the ears are generally parallel and lateral or transverse to the direction of conveying movement. However, the ears do not have endwise orientation, in that some of the ears have their largest diameter ends pointing in one direction, while the other ears have their largest diameter ends pointing in an opposite direction. As the ears 14 are moved toward the discharge end of the table, they pass over the endless belt conveyers 16. The upper runs of these conveyers are coincident with the plane of the table surface. The two endless belt conveyers 16 are driven by suitable means in opposite directions as indicated. In other words, the two belts are counter-rotating.

At the discharge end of the table 11 the products are deposited upon the upper end of the downwardly sloped roll surface 17. Channels 18 are disposed along the side edges of the surface 17 and represent suitable means for receiving the products.

Operation of the apparatus shown in FIGURES 1 and 2, and the carrying out of our method is as follows. Means not illustrated is employed to supply the ears of corn to the right hand end of the table 11, as shown in FIGURE 1. One ear of corn is deposited in the space between each pair of flights. The orientation at this time is indiscriminate in that the largest diameter ends of some ears point in one direction, and the largest diameter ends of the other ears point in the opposite direction. Likewise, the ears are deposited without regard to their positioning relative to the sides of the table. In other words, some ears may be near one side edge of the table, and others may be nearer the middle. The ears retain their initial positioning relative to the sides of the table until they are moved over the counter-rotating conveyers 16. These conveyers serve to effect an arrangement of the ears whereby their centers of gravity are positioned at or near the center line between the conveyers 16. An ear in this position is illustrated in FIGURE 2. When in this position the ear is acted equally upon by both of the conveyers 16. When the center of gravity of the ear is not centralized with respect to the two conveyers, one conveyer acts upon the ear with more effect than the other, whereby the ear is centralized. This centralization of the ears whereby their centers of gravity are positioned at or near the center line between the conveyers 16, takes place irrespective of the direction in which the largest diameter end is pointed.

As illustrated in FIGURE 1, the ears of corn after being acted upon and arranged in a row by the conveyers 16, move on to the discharge end of the table and are deposited upon the upper end of the sloped roll surface 17. By virtue of the principle of operation described in our aforesaid Patent 3,268,057, the ears roll downwardly in an arcuate manner as illustrated in FIGURE 1, with the result that the ears of one orientation roll into one of the side channels 18, and the ears of the other orientation roll into the other side channel. Thus the ears are deposited in the side channels with their largest diameter ends pointing downwardly. The ears may be removed from the lower ends of these channels for further processing operations.

It is also a characteristic of the positioning action of the conveyers 16 that the smallest end of an ear deposited upon the roll surface 17 is nearest that side of the roll surface toward which the ear rolls. This is by virtue of the fact that the center of gravity of an ear of corn is nearest to its largest diameter end.

It will be evident from the foregoing that our invention avoids indiscriminate or random delivery of the ears of corn to the roll surface 17. Such random delivery tends to decrease orientation efficiency, particularly since it may cause a product to be delivered near the wrong edge of the roll surface, or the products may be bunched too close together on the roll surface and therefore caused to interfere with each other. With our invention, the products are deposited on the roll surface near a central region of the same, and with the smaller end of each product properly spaced from the side edge toward which it rolls. In other words, there is adequate control over the areas of the roll surface upon which the products are dropped, thereby increasing the orienting efficiency.

In some instances it may be desirable to supplement the conveyers 16 with the overhead conveyers. As schematically illustrated in FIGURE 3, the overhead conveyers 21 can be spaced from the conveyers 16 in such a manner as to engage the upper sides of the products. Conveyers 21 are likewise counter-rotated with each conveyer 21 being driven in a direction compatible with the underlying conveyer 16. FIGURE 4 illustrates suitable mounting means for the upper conveyers 21. They are shown supported by springs 22, the arrangement being such that the conveyers can move upwardly to accommodate products of different diameters.

FIGURE 5 shows another embodiment in which two sets of rotating belts 26 are employed instead of the conveyers 16 of FIGURE 1. The individual ones of the belts are conventional V belts. They are disposed side by side to form a common upper conveying surface coincident with the plane of the table surface. Two sets are shown disposed at an angle of about 90° to each other. In other words they are arranged V-fashion with the apex of the V at the center of the table and pointed in the direction of movement of the products.

The conveyer arrangement of FIGURE 5 acts like conveyers 16 to move the products into positions with their centers of gravity substantially in alignment with the center of the table. It has been found that diagonally arranged conveyer belts as shown in FIGURE 5 are more effective in moving the ears 14 sideways within the flights 12.

The conveyer arrangement of FIGURE 5 is shown and claimed in our copending application Ser. No. 628,972 filed simultaneously herewith.

It will be evident from the foregoing that we have provided an orienting method and apparatus which utilizes certain of the principles disclosed in our Patent 3,268,057, but with improved efficiency due to the manner in which the products are arranged before they are deposited or released on the roll surface.

We claim:

1. In a method of orienting elongated tapered agricultural products, the steps of conveying the products one-by-one over an upwardly faced working surface, the products having their axes extending laterally to the direction of conveying movement with some having their largest diameter ends pointing in one direction and the others having their largest diameter ends pointing in an opposite direction, arranging the products on the working surface by axial movement of products toward a central region of the surface whereby they are all spaced inwardly of the side edges of the working surface, thereafter depositing the products one by one on the upper portion of a sloped roll surface, causing each of the products to roll in an arc down said surface and toward the edges thereof, whereby the largest diameter ends of the products are caused to point downwardly, and then removing the products from the roll surface at the edges thereof.

2. A method as in claim 1 in which the products are arranged in spaced relationship with the side edges of the working surface by moving them axially to positions in which their centers of gravity are positioned at or near the longitudinal center line of the working surface whereby each product is disposed behind a preceding product.

3. In apparatus for orienting elongated tapered agricultural products, table means forming an upwardly faced working surface, means for conveying said products over the table surface with the axes of the products disposed laterally of the direction of conveying movement, means forming a downwardly sloped roll surface having its upper end located at the discharge end of the table to receive products discharged from the table surface, said roll surface extending downwardly from the discharge end of the conveyer and in the same direction as the conveying movement whereby when said products are deposited thereon from the table surface they are each caused to roll in an arcuate manner down the roll surface, means acting on the products while they are being moved over the table surface to move the same axially to regions spaced inwardly from the side edges of the table surface, and means at the side edges of the roll surface for receiving the products therein with their largest diameter ends pointed downwardly.

4. Apparatus as in claim 3 in which said last-named means for receiving the products forms channels in which the products are deposited.

5. Apparatus as in claim 3 in which the means acting on the products while they are being moved over the table surface to arrange them in regions spaced inwardly from the side edges of the table surface consists of conveyers mounted between the ends of the table surface, said conveyers having portions engaging and acting upon the products to move the same into regions spaced from the side edges of the table surface and adjacent the middle of the same.

6. In apparatus for orienting elongated tapered agricultural products, table means forming an upwardly faced working surface, means for conveying said products over the working surface with the axes of the products disposed laterally of the direction of conveying movement, said means including parallel flights extending laterally across the working surface and moved longitudinally of the working surface, each of the spaces between the flights being adapted to accommodate a product, means forming a sloped roll surface having its upper end located to receive products discharged from one end of the working surface, said roll surface extending downwardly from the discharge end of the working surface and in the same direction as the direction of conveying movement whereby when said products are deposited thereon they roll in an arcuate path down the roll surface, conveyers acting on the products while they are being moved toward the roll surface, said conveyers having moving portions contiguous with the plane of the working surface and extending from the side edges of the working surface to the center thereof, said portions acting upon products to cause such products to be arranged in a central region of the working surface, and means at the side edges of the roll surface for receiving the products with their largest diameter ends pointed downwardly.

References Cited

UNITED STATES PATENTS

| | | | |
|---|---|---|---|
| 2,541,300 | 2/1951 | Silva | 198—32 |
| 3,268,057 | 8/1966 | Ross | 198—32 |

RICHARD E. AEGERTER, *Primary Examiner.*